Feb. 15, 1955 A. M. GUREWITSCH ET AL 2,701,909
METHOD OF MAKING GLASS TO METAL SEALS
Filed Oct. 11, 1950
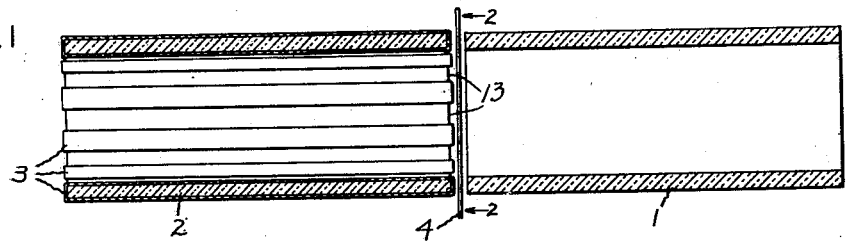
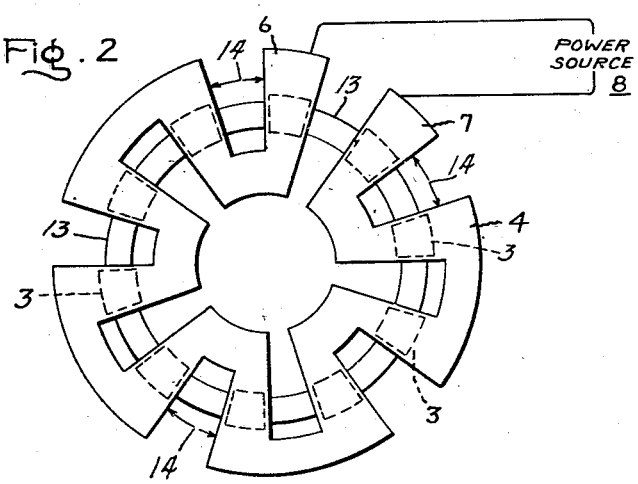
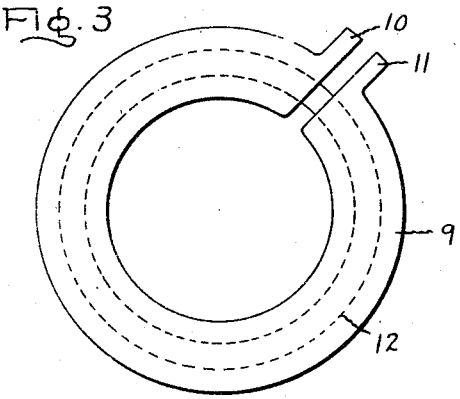
Inventors
Anatole M. Gurewitsch
Herbert C. Pollock
by Paul A. Frank
Their Attorney

United States Patent Office 2,701,909
Patented Feb. 15, 1955

2,701,909

METHOD OF MAKING GLASS TO METAL SEALS

Anatole M. Gurewitsch and Herbert C. Pollock, Schenectady, N. Y., assignors to General Electric Company, a corporation of New York Application October 11, 1950, Serial No. 189,560

2 Claims. (Cl. 29—472.7)

This invention relates to glass to metal seals. More particularly, it relates to a new and simple method of making fluid-tight glass to metal seals in hollow ceramic or vitreous structures.

An object of this invention is to provide a new and improved method of sealing together in a fluid-tight manner ceramic or glass structures.

Another object of the present invention is to provide a new and improved method of sealing together in a gas-tight manner hollow ceramic or glass structures.

A further object of the invention is to provide a means of sealing together in a fluid-tight manner the ends of hollow glass parts, one or both parts having fixed thereto spaced strips of metal or which are substantially metallized.

Other objects will become apparent and the invention better understood from a consideration of the following description and the drawing in which Fig. 1 is a cross-sectional view of the arrangement for sealing parts according to the invention; Fig. 2 is a view taken in the direction 2—2 of Fig. 1; and Fig. 3 is a view of another application of the invention.

It has been found that hollow ceramic or vitreous structures may be sealed together fluid-tight very readily. More particularly, it has been found that hollow ceramic or vitreous structures may be readily sealed gas-tight by placing between the parts to be sealed and in contact therewith a thin strip or ribbon of metal conforming in general to the configuration of the edges to be joined and passing therethrough an electric current to fuse the edges of the structures to the heater strip. Preferably, to avoid undue local strains in the structure in the region of the heated metal strip, the entire assembly is first heated to a temperature of the order of and below the fusion temperature of the ceramic or vitreous material.

The invention is particularly applicable to the production of fluid-tight seals between ceramic or vitreous structures one or both parts of which have fixed thereto spaced metal areas, the metal areas being on the portions to be joined and to parts which are substantially metallized. The invention is also applicable to ceramic or vitreous parts which are entirely unmetallized.

It is necessary for the operation of the present invention that the heater strip or ribbon be of a metal which has a melting point substantially higher than that of the ceramic or vitreous parts being joined. While copper, silver, and platinum have been found very satisfactory in this role, metals such as gold, nickel, and others, which will occur to those skilled in the art, may be used. The only requirements for the heater strip are that it must serve as an electrical resistance which heats and fuses the adjacent glass, that it fuse to the contacting metal coating, and that its thickness must not be great enough to cause distortion or destruction of the seal by reason of the difference in coefficient of thermal expansion of the metal of the heater ribbon and the ceramic or vitreous parts sealed. In this connection, it has been found that a ribbon not more than about one mil in thickness may be used with ceramic or vitreous materials without producing destructive strains under varying temperature.

For a more complete understanding of the present invention reference is made to the drawing.

In Figs. 1 and 2 there is illustrated the present invention as applied to the sealing together of two ceramic or vitreous structures or parts, one part of which has fixed to the surfaces to be joined a plurality of metal strips. There is shown an untreated or plain vitreous or ceramic part 1 which is to be sealed to part 2, the latter having thereon a number of metal strips 3, the thickness of which have been accentuated in the drawing for purposes of clarity. Actually, the strips are of the order of one mil in thickness, may be of any one of many suitable metals such as silver well-known to fuse or weld with the metal of ribbon 4 when subjected to localized heating over an area of contact therewith, and may be applied in any of the well-known ways. Thus, the strips may be laid on the ceramic or vitreous material in the form of foil and baked or fired onto the surface. Alternatively, the strips may be applied as a paint in which the metal particles are suspended and the piece fired to leave only the metal. Other means of applying the metal strips are well known to those skilled in the art.

In the practice of the present invention the two parts 1 and 2 are juxtaposed and maintained in intimate contact with a heater strip or ribbon 4 which is positioned between them and in contact therewith. The purpose of the heater ribbon 4, as pointed out above, is to heat parts 1 and 2 to the point of fusion of the vitreous or ceramic material at which part 1 fuses and forms a seal with ribbon 4. The edge portions 13 of part 2 between the strips 3, as well as the strips themselves, also seal with ribbon 4. As best shown in Fig. 2, in order to prevent short circuiting strips 3 with one another in those cases where strips 3 are destined to carry different electric potentials, ribbon 4 is preferably made in a zig-zag or other shape which is adapted to cover only the metal strips 3 which become disconnected from one another when the external portions of ribbon 4 are later removed from the exterior and interior of the sealed structures. The adjacent radially extending portions of ribbon 4 are preferably closely spaced as shown leaving small gaps 14 therebetween. Ends or terminals 6 and 7 are also closely spaced as shown and are connected to a source of electrical power 8 which is energized to heat ribbon 4 to fuse parts 1, 2, 3, and 4 together in a fluid-tight seal by effecting a fusion between part 1 and ribbon 4, part 2 and ribbon 4, strips 3 and ribbon 4, and between part 1 and part 2 in the regions 14 between the radially extending portions of ribbon 4.

While heater ribbon 4 may be used to heat the parts to be sealed from room temperature up to the point of fusing, such localized heating, especially if carried out rapidly, may produce undue strains in the ceramic or vitreous parts and lead to structural failure. It is, therefore, preferable to slowly preheat the entire assembled parts or assembly in an oven or furnace, not shown, to a point within fifty or one-hundred degrees of the fusion point of the ceramic or vitreous material or to such temperature that further localized heating by heater 4 will not cause failure-producing strains in the structure. Then while still in the oven or furnace, electric current is passed through the resistance heater ribbon 4 and the parts raised thereby to the sealing temperature. After the sealed structures have cooled, the heater strip may be removed from the exterior and interior of the structure, if desired, leaving a smooth joint with no short circuiting interconnections of ribbon 4 between strips 3. The extremely localized fusion of the material using the present process tends toward a smoother seal than is possible using other methods.

While the present invention is particularly applicable to and useful where one or both of the parts to be sealed have fixed thereto spaced metal strips, it is also applicable to the sealing of ceramic or vitreous parts, the joining edges of which are partly metallized or substantially covered with metal. It is likewise applicable to the sealing of such parts, neither of which is metallized. In those cases where only part of one or both surfaces to be joined is metallized and are destined to carry different electric potentials, the heater ribbon should be in some form such as 4 to avoid short circuiting the metallized parts when the externally extending portions of ribbon 4 are removed. Where one or both joining surfaces are almost entirely metallized or not metallized at all or where the various metallized parts are not destined to carry electricity or different electric potentials, the heater ribbon may be in the form of a split washer, as shown at 9, with the closely spaced terminals or ends 10 and 11 being connected to a source of power during the fusing operation. This type of heater is fitted between the surfaces or edges, only one, 12, being shown, which are to be sealed together as in the previous example. Care should be taken, as above, where the one or both parts are partially metallized, that such metallized surfaces do not short circuit the gap between terminals 10 and 11 of washer 9 or have a resistivity substantially lower than washer 9 so as to short circuit the washer itself.

The present invention is particularly useful in sealing together structures in which the various components have widely varying coefficients of thermal expansion. Thus, the present process has been employed in sealing together vitreous structures, one part having fixed thereto spaced silver metal strips, the coefficient of thermal expansion of the basic structure being $3.2 \times 10^{-6}$ and that of the silver metal strips about $17. \times 10^{-6}$ while the platinum heater strip has a coefficient of $9. \times 10^{-6}$. As pointed out above, copper having a coefficient of thermal expansion of about $15. \times 10^{-6}$ and silver, coefficient about $17. \times 10^{-6}$, have also been successfully used as heater strips.

There is provided by the present invention a new and improved method of sealing together ceramic or vitreous structures as well as such structures having a part or all of one or both joining surfaces metallized. While there have been described certain examples of the practice of the present invention, it is to be understood that these are not to be taken in a limiting sense but as merely illustrative of the spirit and scope of the invention which it is desired to protect.

What we claim as new and desire to secure by Letters Patent of the United States is:

1. The method of making a non-electrically conducting fluid-tight seal between two structures composed of vitreous material, at least one of said structures having spaced portions of its surface to be sealed covered with strips of metal less than .001 inch thick extending along at least one of said structures and respectively insulated from each other, which method comprises placing between and maintaining in contact with closely spaced portions of both said structures an open ended zig-zag metal heater ribbon less than .001 inch thick as measured between said structures and having a melting point above that of the material of said structures, the heater ribbon being arranged to contact said metal strips with portions of said ribbon between said strips extending exterior to said structures, passing an electric current through said ribbon to heat said ribbon and fuse said structures and said metal strips to said heater ribbon and to each other, and removing the exterior portions of said heater ribbon to electrically separate said strips.

2. The method of claim 1 wherein the metal heater ribbon is selected from a class consisting of copper, silver, platinum, gold and nickel and the structures and contacting metal ribbon are raised to a temperature of the order of and below the fusion point of said structures before the electric current is passed through the ribbon.

References Cited in the file of this patent

UNITED STATES PATENTS

| Number | Name | Date |
|---|---|---|
| 495,240 | Benjamin | Apr. 11, 1893 |
| 2,106,143 | Williams | Jan. 18, 1938 |
| 2,125,316 | Ronci | Aug. 2, 1938 |
| 2,386,820 | Spencer | Oct. 16, 1945 |
| 2,388,242 | Arndt | Nov. 6, 1945 |
| 2,445,063 | Guyer | July 13, 1948 |
| 2,526,703 | Smith | Oct. 24, 1950 |

FOREIGN PATENTS

| Number | Country | Date |
|---|---|---|
| 108,056 | Australia | July 21, 1937 |
| 549,277 | Great Britain | Nov. 13, 1942 |